Jan. 23, 1940.  E. R. GREER  2,187,970
TRAILER HITCH
Filed May 24, 1937  3 Sheets-Sheet 1

INVENTOR
EDWARD R. GREER
BY
ATTORNEYS

INVENTOR
EDWARD R. GREER
BY Paul, Paul & Moore
ATTORNEYS

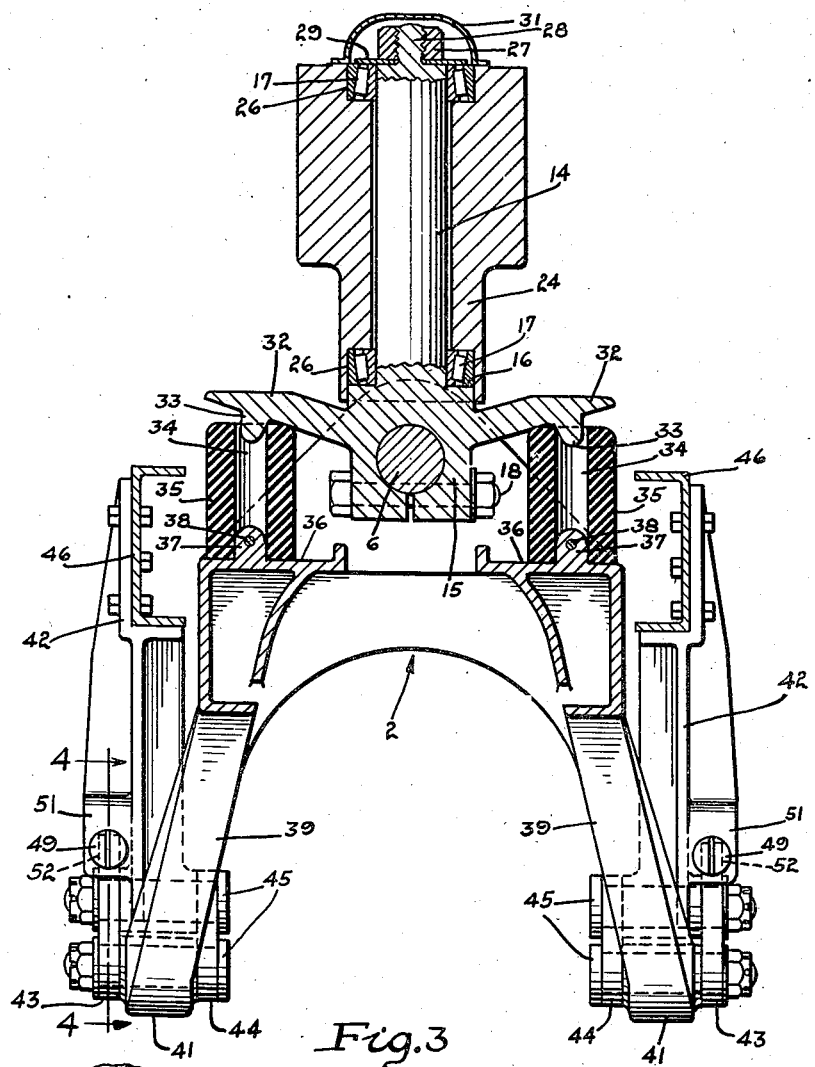
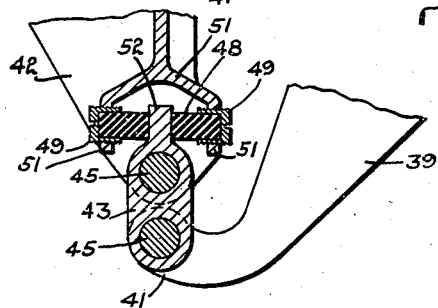
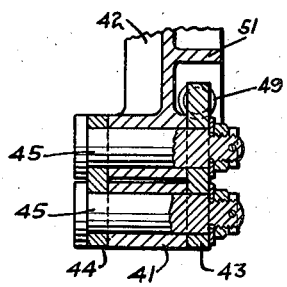

Patented Jan. 23, 1940

2,187,970

UNITED STATES PATENT OFFICE 2,187,970

TRAILER HITCH

Edward R. Greer, Minneapolis, Minn.

Application May 24, 1937, Serial No. 144,403

6 Claims. (Cl. 280—33.44)

This invention relates to new and useful improvements in trailer hitches of the general character disclosed in my Patent No. 1,990,731, issued February 12, 1935.

An object of the present invention is to provide a trailer hitch which is particularly well suited for coupling a semi-trailer to a four-wheel drive power unit, the hitch being so designed that the load transmitted to the power unit from the trailer, is so located with respect to the front and rear wheels thereof, that the load is approximately balanced on the four drive wheels of the power unit, thereby providing maximum traction effort for each wheel.

A further object is to provide a hitch of the character disclosed comprising a yieldable connection between the power unit and the trailer adapted to cushion the draw bar pull exerted on the hitch, when the power unit is started.

A further object is to provide a hitch comprising a yoke having depending arms whose lower ends are pivotally connected to the frame of the power unit forwardly of and below the axis of the rear wheels thereof, whereby the draw bar pull exerted on the hitch will only slightly tend to lift the forward end of the power unit.

A further and more specific object resides in the unique construction of the hitch, which comprises a horizontal spindle mounted in suitable bearings in the yoke and having a vertical spindle fixed thereto and to which the forward end of the trailer is coupled, said spindles providing a universal connection between the power unit and the trailer, whereby the apparatus may travel over hills and banks, and other rough places, without imparting excessive strains to the hitch or power unit.

A further object is to provide a hitch which readily lends itself for use in connection with four wheel drive power units, in which the front and rear wheels are provided with independent steering mechanisms.

A further object is to provide a control for a semi-trailer whereby the pivotal connection for the trailer may be offset from the line of travel of the front wheels of the power vehicle, which is a very desirable feature, particularly when hauling dirt for placement on a very rough or sloping fill, as it permits positioning of the trailer in such a manner with respect to the power unit, that the natural "drift" of the trailer, when traveling on a side hill, is overcome. This feature is only practical in power vehicles having four-wheel drives and independent steering mechanisms for the front and rear wheels thereof, and in which the hitch is so constructed as to substantially balance the load on the four wheels of the power unit.

Other objects of the invention reside in the unique construction of the stabilizing means provided in the hitch, which resiliently restrains relative rocking movement of the trailer about the axis of the horizontal spindle; in the construction of the coupling member which receives the vertical spindle, and to which the forward end of the trailer is detachably secured, and whereby trailers of different types may be coupled to the power unit; in the unique construction of the operative connection between the yoke and the brackets secured to the frame of the power unit, which connection comprises resilient elements for cushioning the draw bar pull in both forward and rearward directions; and, in the provision of a trailer hitch which is extremely simple and inexpensive in construction and which is exceedingly strong and durable, whereby it may be used for coupling to the power unit, large semi-trailers such as are now commonly used for transporting freight and other commodities over long distances.

Other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

In the drawings:

Figure 3 is a cross-sectional view on the line 3—3 of Figure 1, showing the stabilizing means;

Figure 4 is a detail sectional view on the line 4—4 of Figure 3, showing the means for cushioning the draw bar pull on the hitch;

Figure 5 is a detail sectional view on the line 5—5 of Figure 1;

Figures 1, 6:
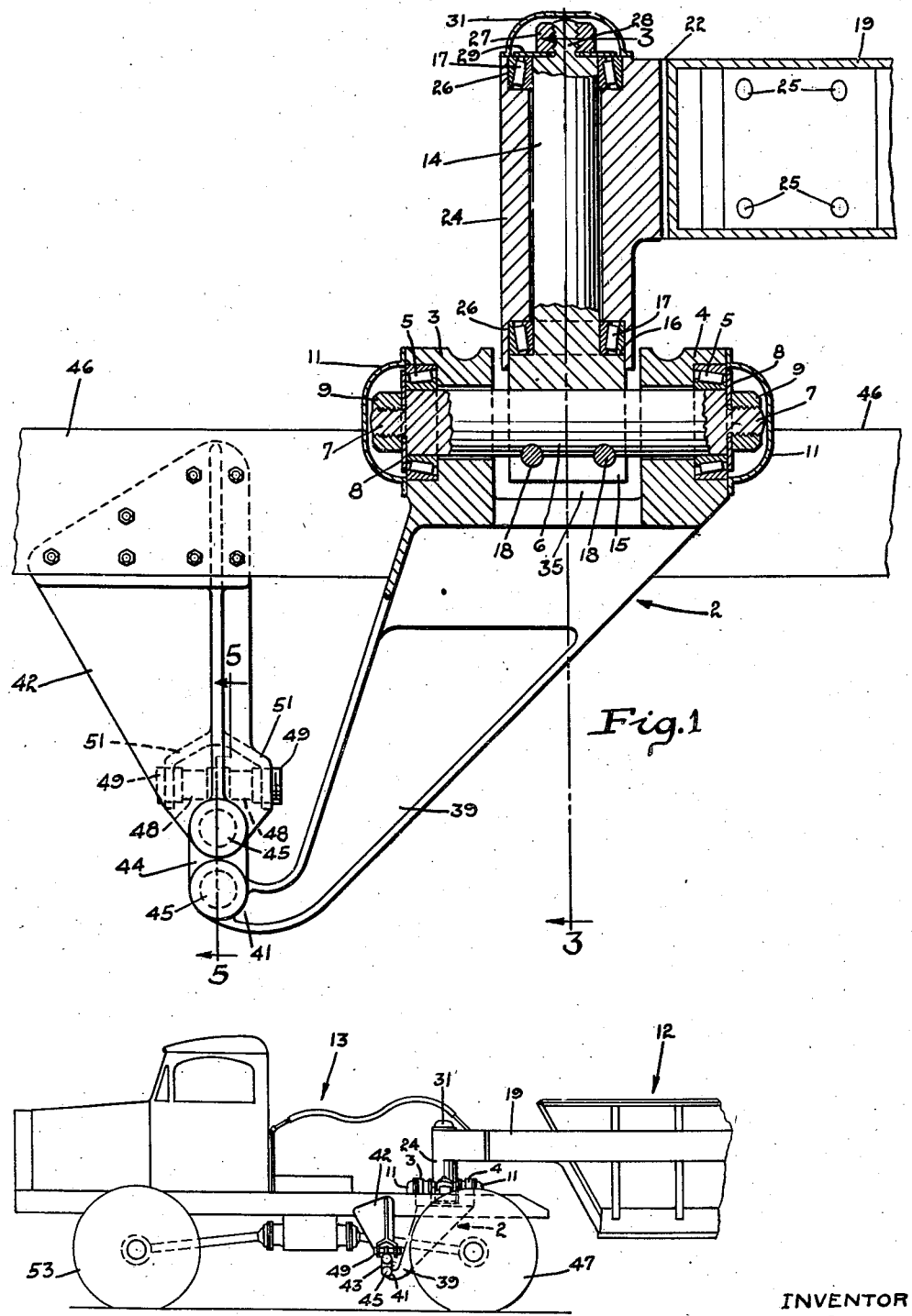
Figure 1 is a vertical sectional view substantially on the line 1—1 of Figure 2, showing the position of the hitch between the power unit and the trailer.
Figure 6 is a schematic view, showing a semi-trailer coupled to a four-wheel drive power unit.
Figure 2:
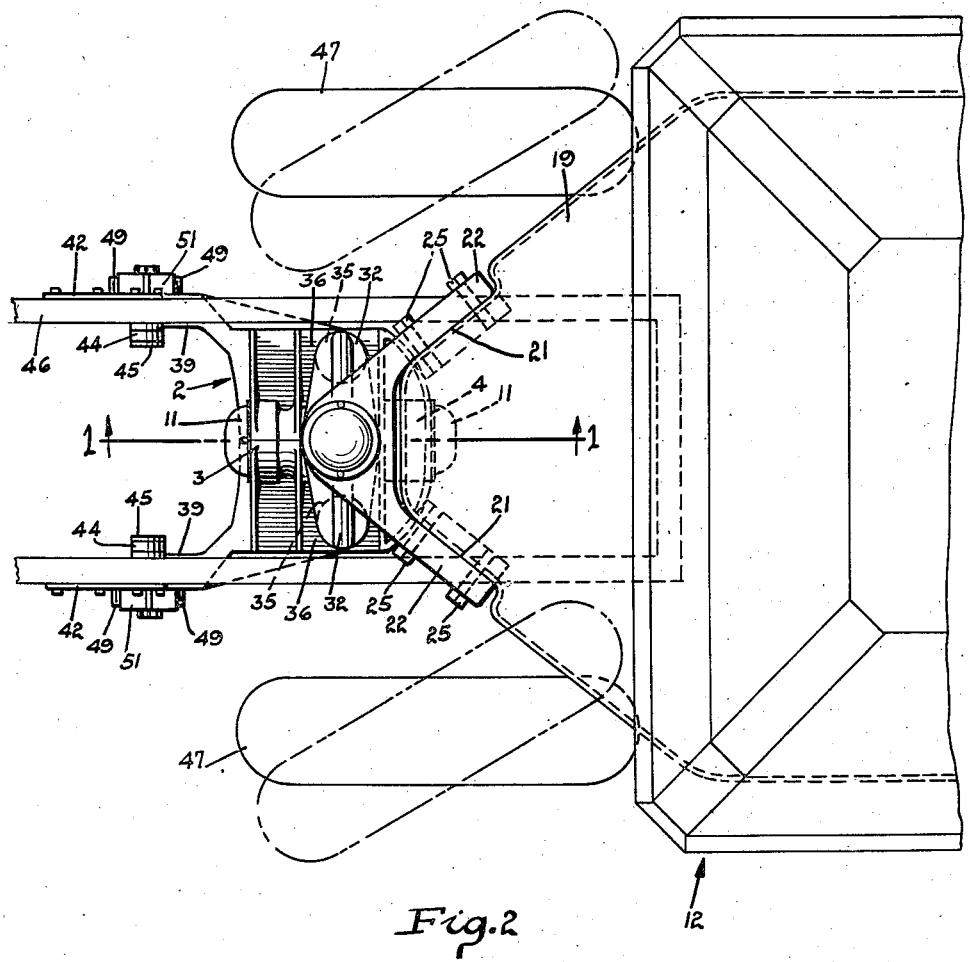
Figure 2 is a plan view of Figure 1.

The novel hitch herein disclosed is shown comprising a yoke, generally indicated by the numeral 2, having spaced bearings 3 and 4 provided in the upper portion thereof, shown bored to receive suitable anti-friction roller bearings 5 which cooperate to support a horizontal spindle 6, having its terminals fitted into the inner races of the roller bearings 5, as clearly illustrated in Figure 1. The spindle 6 is provided with reduced threaded terminals 7 adapted to receive washers 8 and suitable nuts 9 for retaining the spindle 6 in the bearings 3 and 4, and to prevent endwise movement thereof. Suitable dust caps 11 are shown fitted against the ends of the bearings 3 and 4 to prevent dust and other foreign matter from entering the bearings 5.

Figure 7:
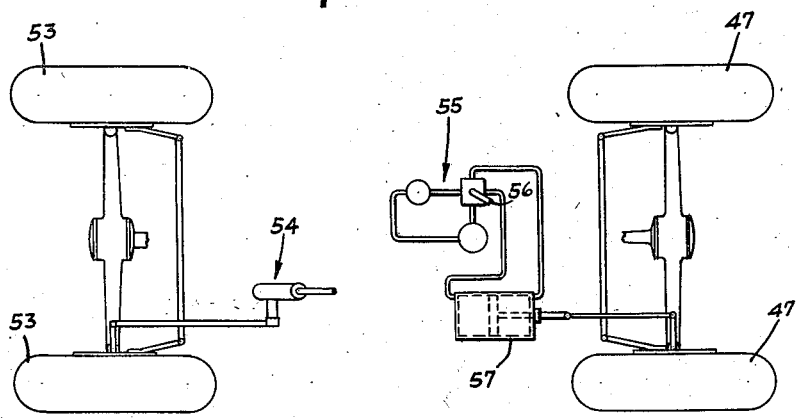
Figure 7 is a schematic view showing a four-wheel drive power unit in which the front and rear wheels are provided with independent steering mechanisms.

A feature of the invention resides in the construction of the means for coupling the forward end of the trailer, generally indicated by the numeral 12, to the power unit, indicated by the numeral 13 in Figure 7.

The means provided for connecting or coupling the trailer to the yoke 2 is shown comprising a vertical spindle 14 provided at its lower end with a split hub 15, bored to receive the horizontal spindle 6, as clearly illustrated in Figures 1 and 3. A horizontally disposed shoulder 16 is provided at the juncture between the hub 15 and spindle 14 and provides a seat for a suitable thrust bearing 17 which, as shown in Figures 1 and 3, also serves as a radial bearing.

The hub 15 of the spindle 14 is fixed to the horizontal spindle 6 by suitable bolts 18 which, in addition to clampingly securing the hub 15 to the spindle 6, also serve as keys to prevent axial movement of the hub 15 on the spindle 6. By reference to Figures 1 and 3, it will be noted that the apertures which receive the bolts 18 are drilled through a portion of the spindle 6, whereby the bolts are partially seated in the spindle 6, as best shown in Figure 1, thereby to prevent relative axial movement of the hub 15 upon said spindle.

The forward end of the trailer 12 is, in the present instance, shown comprising a triangular frame 19, preferably notched as shown at 21 to receive a pair of rearwardly and outwardly extending arms or lugs 22, shown integrally formed with a coupling member or hub 24, bored to receive the vertical spindle 14. Suitable bolts or screws 25 detachably secure the forward end 19 of the trailer frame to the arms 22 of the coupling member 24.

An anti-friction bearing 17 is also fitted to the upper end of the vertical spindle 14. The bearings 17 are received in suitable counter bores 26 provided in the hub of the coupling member 24, and are retained in position therein by a suitable nut 27, received in threaded engagement with the upper reduced threaded terminal 28 of the spindle 14, as clearly shown in Figures 1 and 3. A suitable washer 29 is interposed between the end of the spindle 14 and the threaded terminal 28 and overlies the upper end of the upper bearing 17. A dust cap 31 is suitably secured to the upper end of the hub of the coupling member 24 to prevent foreign matter from entering the upper bearing 17.

Means is provided for stabilizing the relative rocking movement of the trailer and power unit about the axis of the horizontal spindle 6 and, as best shown in Figure 3, comprises a pair of oppositely disposed arms 32, shown integrally formed with the hub 15 of the spindle 14. The arms 32 are provided with depending projections 33 adapted to be received in recesses or bores 34 of a pair of resilient elements 35. The lower ends of the elements 35 are supported on suitable seats 36 provided on the yoke 2, and are secured thereto by upstanding lugs 37 received in the bores 34 of the elements 35, whereby the lugs 37 center the resilient elements 35 on the seats 36. Suitable bolts 38 are received in alined apertures provided in the resilient elements 35 and lugs 37, to prevent accidental detachment of the resilient elements from the yoke. The upper ends of the resilient elements 35 are preferably disposed above the axis of the horizontal spindle 6, and the elements are of such height that they are under slight compression when the parts are in normal position, as illustrated in Figure 3.

The resilient elements 35 act to restrain relative rocking movement of the trailer and power unit about the axis of the horizontal spindle 6, thereby to minimize the danger of the trailer or tractor tipping over, if a wheel thereof should drop into a deep hole or go over an embankment.

Another important feature of this invention resides in the unique construction of the means provided for pivotally connecting the yoke 2 to the power unit. As clearly illustrated in Figures 1 and 3, the yoke is provided with depending arms 39 which extend forwardly and outwardly, and have their terminals 41 operatively connected to the lower ends of a pair of brackets 42 by suitable links 43 and 44 and bolts 45. The brackets 42 are shown bolted to the side frame members 46 of the power unit forwardly of the rear wheels 47 thereof.

As best illustrated in Figure 4, the terminals 41 of the arms 39 are alined with their respective brackets 42 and suspended from said brackets by the links 43 and 44 and bolts 45, whereby the yoke 2 is pendently supported from the axes of the upper bolts 45, thereby permitting relative longitudinal movement of the hitch with respect to the power unit.

The means for cushioning or restraining relative forward or rearward movement of the hitch, with respect to the frame of the power unit is shown comprising a pair of oppositely disposed cushion elements 48, supported in suitable retaining cups 49, adjustably secured in flanges 51 provided at the lower end of the brackets 42. Each link 43 is shown provided with an upstanding lug 52 against which the inner ends of the cushion elements 48 are seated, as best illustrated in Figure 4. The retaining cups 49 are so adjusted that the cushion elements are normally under compression, whereby they act to cushion the draw bar pull exerted on the hitch.

The flanges 51, in which the retaining cups are mounted, are so designed as to provide a housing for the cushion elements 48, as clearly illustrated in Figures 3, 4, and 5, thereby to prevent foreign matter, such as dirt, from interfering with the operation thereof.

The novel hitch herein disclosed, is particularly well suited for use to couple a semi-trailer to a four-wheel drive power unit, in which the front and rear traction wheels are provided with independent steering mechanisms, as diagrammatically illustrated in Figure 7. In this figure, it will be noted that the front wheels 53 are provided with a conventional steering mechanism, diagrammatically illustrated and indicated by the numeral 54. The rear wheels 47 are shown provided with a hydraulic steering mechanism, generally indicated by the numeral 55. The steering mechanism 55 has a suitable control valve 56 for controlling the circulation of the fluid in a cylinder 57, which has an operative connection with the rear wheels 47, as shown. The means for independently steering the wheels 47 is of more or less conventional design and it is therefore thought unnecessary herein to illustrate and describe the same in detail.

Because of the unique arrangement of the hitch, the rear wheels 47 of the power unit may readily be turned about their vertical axes to control the traveling movement of the vehicle without interference from the hitch. This will be readily understood by reference to Figure 6, wherein it will be noted that the forward end 19 of the trailer frame is disposed well above the rear wheels 47, whereby the rear end of the power unit may readily be operated to control the traveling movement of the tractor or, if desired, the tractor may be turned at right angles, or even more than right angles, with respect to the trailer, which is a desirable feature in apparatus of this general type.

The location of the pivotal connections between the arms 39 of the trailer hitch and the power unit, is of utmost importance, particularly when the trailer is to be coupled to a four-wheel drive power unit. In order to obtain a balanced condition between the traction effort of the four wheels of the power unit, the load of the forward end of the trailer must be so located on the power unit, that the load is substantially balanced on the four wheels of the power unit.

The novel hitch herein disclosed, has been designed with this point in mind, and, from actual experience, it has been found that by coupling the arms 39 to the frame of the power unit, substantially as shown in Figure 6, the maximum traction effort is obtained for each wheel. The axes of the lower coupling bolts 45 are disposed at such an elevation below the axis of the rear wheels 47, that the draw bar pull exerted on the arms 39 will have very little tendency to elevate the front wheels 53 of the power unit, whereby maximum traction effort is maintained.

In the drawings, I have shown the vertical spindle 14 as being integrally formed with the hub 15. It is to be understood that these parts may be separately formed and suitably secured together to provide a unitary structure without departing from the scope of the invention. In ordinary practice, the hub of the coupling member 24 is preferably retained on the vertical spindle 14, and if the trailer is to be disconnected from the hitch and another one substituted therefor, the forward end of the trailer frame is uncoupled from the arms 22 of the member 24, by removing the bolts 25. The entire hitch may readily be disconnected from the power unit by simply removing the lower coupling bolts 45, whereby the arms 39 are released from the brackets 42, and the hitch, including the yoke 2 and hub 24, may then remain attached to the forward end of the trailer, as will readily be understood by reference to the drawings.

The hitch is comparatively simple in construction and comprises few parts, all of which are readily accessible and interchangeable. The horizontal spindle 6 and vertical spindle 14, and also the pivotal connections of the arms 39 with the lower ends of the brackets 42, cooperate to provide a universal connection between the power unit and the trailer, whereby the apparatus may be driven over rough ground without danger of the hitch and its associated parts being subjected to excessive strains, as a result of relative tilting movements of the power unit and trailer.

The hitch herein disclosed is particularly well adapted for coupling a semi-trailer to a power unit of the four-wheel drive type, and in which the front and rear wheels are provided with independent steering mechanisms. Semi-trailers are frequently used in the construction of new roads, where the apparatus is often called upon to travel over extremely rough ground, such as fills and embankments. By using a four-wheel drive power unit in which the rear wheels are provided with an independent steering mechanism, the natural tendency of the trailer to drift or slide, when traveling along an inclined surface or slope, may readily be substantially eliminated by simply guiding the rear wheels of the power unit in such a manner as to compensate for the drifting or sliding tendency of the trailer on the slope. Also, by using a power unit of the general type disclosed in Figure 7, the handling of the apparatus is greatly facilitated, as it makes it possible to guide the trailer into places which would be impossible with a conventional power unit wherein only the front wheels are steerable.

I claim as my invention:

1. A trailer hitch comprising a yoke having depending arms adapted to be coupled to a power unit, spaced bearings on the yoke, a horizontal spindle mounted for rocking movement in said bearings, a vertical spindle having a hub mounted on the horizontal spindle between said bearings, means for immovably securing said hub to the horizontal spindle, and a coupling member receiving said vertical spindle and having means for detachably connecting it to the forward end of a trailer frame.

2. A trailer hitch comprising a yoke having depending arms adapted to be coupled to a power unit, bearings on the yoke, a horizontal spindle mounted for rocking movement in said bearings, a vertical spindle having a split hub mounted on the horizontal spindle, a bolt for securing said hub to the horizontal spindle, said bolt being received in a recess in the horizontal spindle whereby the hub is positively secured against relative axial and longitudinal movements, a coupling member on said vertical spindle having means for connecting it to the forward end of a trailer frame, and means for restraining relative rocking movement of the trailer and power unit about the axis of the horizontal spindle.

3. A trailer hitch comprising a yoke having depending arms adapted to be coupled to a power unit, spaced bearings on the yoke, a horizontal spindle mounted for rocking movement in said bearings, a vertical spindle having a hub mounted on the horizontal spindle between said bearings, means immovably securing said hub to the horizontal spindle, a coupling member receiving said vertical spindle and having means for detachably connecting it to the forward end of a trailer frame, and means for resiliently resisting rocking movement of the horizontal spindle in said bearings.

4. A trailer hitch comprising a yoke having depending arms adapted to be coupled to a power unit, spaced bearings on the yoke, a horizontal spindle mounted for rocking movement in said bearings, a vertical spindle fixedly secured to said horizontal spindle between said bearings, a coupling member having means for detachably connecting it to the forward end of a trailer frame and having a bearing adapted to receive the vertical spindle, cushion elements seated on said yoke at opposite sides of the vertical spindle, and oppositely disposed arms secured to said spindle and adapted to engage said cushion elements, thereby to resist rocking movement of said spindles.

5. A trailer hitch comprising a yoke having depending arms, spaced bearings on the yoke, a horizontal spindle mounted for rocking movement in said bearings, a vertical spindle having a hub mounted on the horizontal spindle between said bearings, means immovably securing said hub to the horizontal spindle, a coupling member receiving said vertical spindle and having means for securing it to the forward end of a trailer frame, and means for resiliently connecting the lower ends of the yoke arms to a power unit.

6. A trailer hitch comprising a yoke having depending arms, spaced bearings on the yoke, a horizontal spindle mounted for rocking movement in said bearings, a vertical spindle fixedly secured to said horizontal spindle between said bearings, a coupling member having means for connecting it to the forward end of a trailer frame and having a bearing adapted to receive the vertical spindle, cushion elements for resiliently resisting rocking movement of the spindles, and means for yieldably connecting the lower ends of the yoke arms to a power unit.

EDWARD R. GREER.